United States Patent
Vinh et al.

(10) Patent No.: US 7,653,857 B2
(45) Date of Patent: Jan. 26, 2010

(54) POWER CONTROL OF PACKET DATA TRANSMISSION IN CELLULAR NETWORK

(75) Inventors: Phan van Vinh, Oulu (FI); Ling Yu, Oulu (FI); Markku J. Vainikka, Kiviniemi (FI)

(73) Assignee: Nokia Corporation, Espoo (FI)

( * ) Notice: Subject to any disclaimer, the term of this patent is extended or adjusted under 35 U.S.C. 154(b) by 446 days.

(21) Appl. No.: 11/350,866

(22) Filed: Feb. 10, 2006

(65) Prior Publication Data

US 2006/0236190 A1 Oct. 19, 2006

(30) Foreign Application Priority Data

Apr. 13, 2005 (FI) .................................. 20055169

(51) Int. Cl.
  *H04L 1/18* (2006.01)
(52) U.S. Cl. ....................................... 714/749; 714/750
(58) Field of Classification Search ................. 455/517, 455/522, 423; 370/31, 332, 311; 714/749, 714/750
See application file for complete search history.

(56) References Cited

U.S. PATENT DOCUMENTS

| | | | | |
|---|---|---|---|---|
| 6,741,866 B1 * | 5/2004 | Gustavsson | ................. | 455/522 |
| 6,985,453 B2 * | 1/2006 | Lundby et al. | ............... | 370/311 |
| 7,082,107 B1 * | 7/2006 | Arvelo | ........................ | 370/311 |
| 7,292,873 B2 * | 11/2007 | Wei et al. | ..................... | 455/522 |
| 2002/0004407 A1 * | 1/2002 | Simonsson | .................. | 455/522 |
| 2003/0003905 A1 * | 1/2003 | Shvodian | ..................... | 455/423 |
| 2004/0141460 A1 | 7/2004 | Holtzman et al. | | |
| 2004/0179493 A1 * | 9/2004 | Khan | .......................... | 370/332 |
| 2005/0009551 A1 * | 1/2005 | Tsai et al. | .................... | 455/522 |
| 2005/0032536 A1 * | 2/2005 | Wei et al. | ..................... | 455/517 |
| 2006/0056356 A1 * | 3/2006 | Arvelo | ........................ | 370/332 |

FOREIGN PATENT DOCUMENTS

| | | |
|---|---|---|
| EP | 1 050 977 A2 | 11/2000 |
| WO | WO 2004/088876 A1 | 10/2004 |
| WO | WO 2006/018481 A1 | 2/2006 |

* cited by examiner

*Primary Examiner*—David Ton
(74) *Attorney, Agent, or Firm*—Squire, Sanders & Dempsey L.L.P.

(57) ABSTRACT

A transmitter for a packet radio network, including means for transmitting a signal including data packets to a receiver, means for receiving acknowledgement messages from the receiver, each acknowledgement message indicating whether or not a data packet was received successfully, and means for adjusting transmit power of the signal in the transmitter on the basis of one or more acknowledgement messages.

26 Claims, 4 Drawing Sheets

POWER CONTROL OF PACKET DATA TRANSMISSION IN CELLULAR NETWORK

BACKGROUND OF THE INVENTION

1. Field of the Invention

The invention relates to control of transmit power in a packet radio network.

2. Description of the Related Art

One of the consequences of bearer-less packet access in B3G cellular networks is that power control (PC) for user packet transmissions mainly relies on open-loop power control, including initial power setting and self-adjustment likely on a packet-by-packet basis.

In B3G cellular networks, however, strict power restriction of mobile terminals can be expected. The performance of an open-loop PC, also referred to as PC accuracy, depends on the dynamic range of fading channel conditions and capabilities and the performance of link adaptation schemes.

A need will arise for a fade-margin setting in an open-loop PC operation in order to assure a reliable and robust radio performance over fading channels. The fade margin can be defined as a margin between a specified target signal level and a local root-mean-square amplitude of the fading envelope. The smaller the fade margin is, the lower the additional transmit power is needed to combat the impact of fading. The fade margin is usually set by the network to be equal for all mobile terminals.

Currently, the network estimates a proper value for the fade margin based on the amount of traffic and measurement results regarding transmitted data packets. This kind of estimation does not provide an adequately precise basis for determining a fade margin parameter, which thereby results in non-optimal usage of the network.

SUMMARY OF THE INVENTION

An object of the present invention is to provide a method and an apparatus so as to alleviate the above disadvantages. In one aspect of the invention, there is provided a method of controlling transmit power in a packet radio network, including steps of transmitting data packets from a transmitter to a receiver, evaluating quality of each data packet received in the receiver, sending an acknowledgement message from the receiver to the transmitter, the acknowledgement message indicating whether or not the data packet was received successfully, and adjusting transmit power in the transmitter on the basis of the acknowledgement message.

In another aspect of the invention, there is provided a transmitter for a packet radio network, including means for transmitting a signal including data packets to a receiver, means for receiving acknowledgement messages from the receiver, each acknowledgement message indicating whether or not a data packet was received successfully, and means for adjusting transmit power of the signal in the transmitter on the basis of one or more acknowledgement messages.

In still another aspect of the invention, there is provided a computer program product encoding a computer program of instructions for executing a computer process for controlling transmit power in a transmitter for a radio network, the process comprising steps of transmitting data packets from a transmitter to a receiver, receiving an acknowledgement message from the receiver, the acknowledgement message indicating whether or not the data packet was received successfully, and adjusting transmit power in the transmitter on the basis of the acknowledgement message.

In still another aspect of the invention, there is provided a computer program distribution medium readable by a computer and encoding a computer program of instructions for executing a computer process for controlling transmit power in a transmitter for a radio network, the process comprising steps of transmitting data packets from a transmitter to a receiver, receiving an acknowledgement message from the receiver, the acknowledgement message indicating whether or not a data packet was received successfully, and adjusting transmit power in the transmitter on the basis of the acknowledgement message.

Preferred embodiments of the invention are disclosed in the dependent claims.

The invention thus relates to power control of a transmit signal in packet radio network. In one embodiment of the invention, the network is a UMTS (Universal Mobile Telephony System) network applying WCDMA (Wideband Code Division Multiple Access) access method.

In one embodiment, the invention is applied to a network supporting High Speed Downlink/Uplink Packet Access (HSDPA/HSUPA), which is a packet-based data service in a WCDMA (Wideband Code Division Multiple Access) network. The network according to the invention can support HSDPA/HSUPA protocol elements, such as HARQ (Hybrid Automatic Retransmission Request). Taking the uplink as an example, a data transfer mechanism in the HSUPA can be provided by physical HSUPA channels, such as an E-DPDCH (Enhanced Dedicated Physical Data Channel), implemented on top of WCDMA uplink physical data channels, such as a DPCCH (Dedicated Physical Control Channel) and a DPDCH (Dedicated Physical Data Channel).

In a system applying HARQ, a cyclic redundancy check (CRC) procedure, for example, can be used to test the success of the reception of each data packet. An acknowledgement message is generated in a receiver for each data packet on the basis of the test. If the data packet was received successfully, the acknowledgement message indicates "acknowledgement (ACK)". If the data block was received unsuccessfully, the acknowledgement message indicates "non-acknowledgement (NACK)". The transmitter of the data packet, that is, the receiver of the acknowledgement message, is thus adapted to receive an ACK/NACK message. However, if the receiver of the acknowledgement message is unable to decode the acknowledgement message, the receiver interprets the transmission to be discontinuous transmission (DTX).

In the invention, transmit power of data packets is controlled on the basis of the acknowledgement message. In one embodiment, if ACK is received, the transmit power of subsequent data packets can be decreased. If NACK/DTX is received, the transmit power of future data packets can be increased. In one embodiment, the transmit power is controlled by tuning the fade margin of a connection. The fade margin depicts excess power over the target signal power. The target signal here depicts signal power which is determined by an open-loop power control mechanism. In one embodiment, user equipment measures a downlink signal power level and compares a measured value to the originally used power level. Using these two power levels, the user equipment can determine the path loss between the user equipment and the network and obtain the target signal level as a result. The fade margin parameter indicates the excess power, which can be added to the target signal level so as to obtain the transmit signal power level.

The invention provides the advantage of keeping the transmit power as low as possible while maintaining adequate system performance.

BRIEF DESCRIPTION OF THE DRAWINGS

In the following, the invention will be described in greater detail by means of preferred embodiments with reference to the attached drawings, in which.

DETAILED DESCRIPTION OF THE PREFERRED EMBODIMENTS

Figure 1:
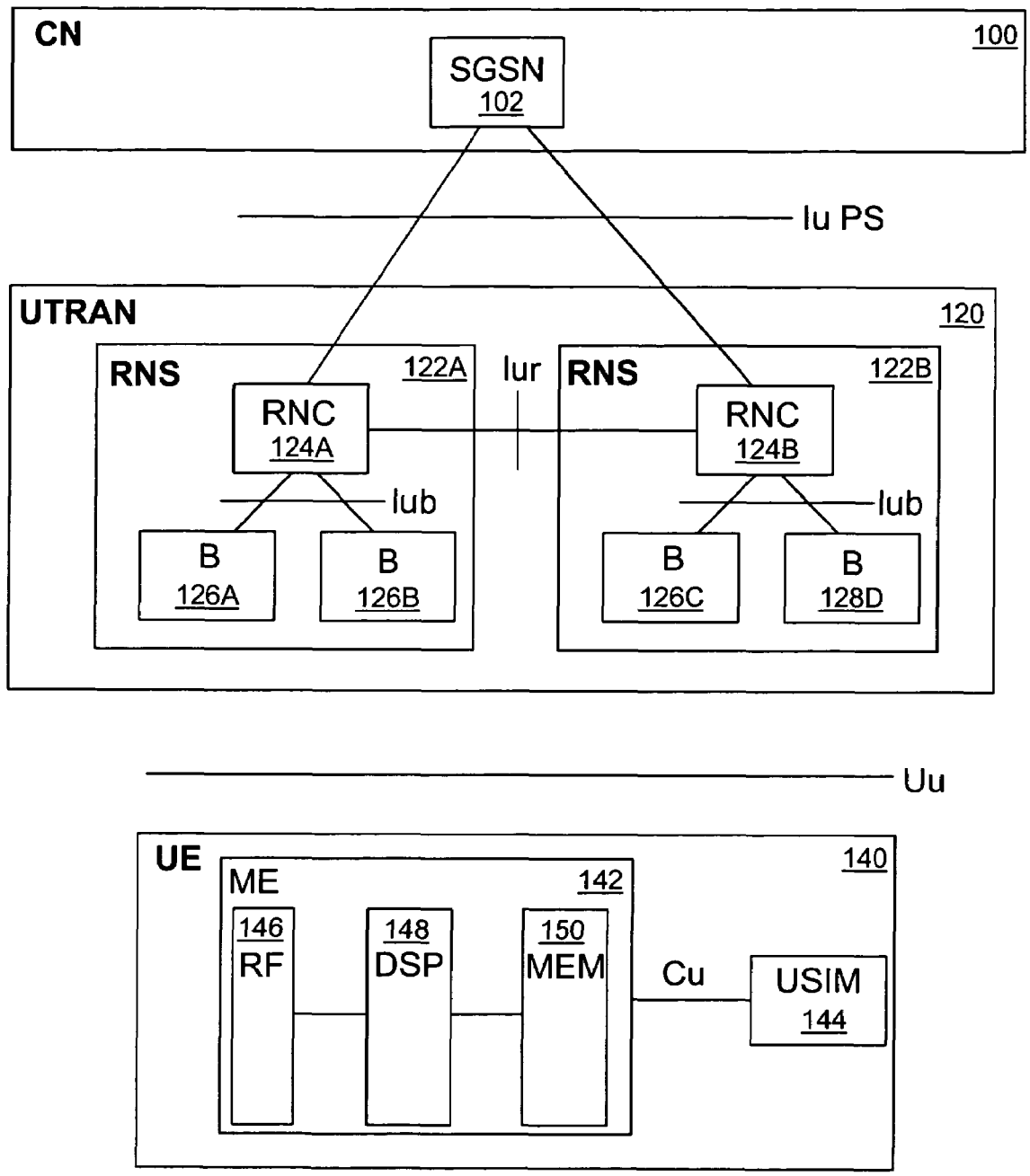
FIG. 1 shows one embodiment of a radio network.

FIG. 1 illustrates an example of a wireless telecommunications system to which the present solution may be applied. Below, embodiments of the invention will be described using UMTS (Universal Mobile Telecommunications System) as an example of a wireless telecommunications system. The invention may, however, be applied to any wireless telecommunications system which supports data packet transmission. The invention can be applied to a radio network, which supports HSUPA protocol elements, such as HARQ (Hybrid Automatic Retransmission Request). The structure and functions of such a wireless telecommunications system and those of the associated network elements are only described when relevant to the invention.

The wireless telecommunications system may be divided into a core network (CN) 100, a UMTS terrestrial radio access network (UTRAN) 120, and user equipment (UE) 140. The core network 100 and the UTRAN 120 are part of a network infrastructure of the wireless telecommunications system. The UTRAN 120 is typically implemented by wideband code division multiple access (WCDMA) radio access technology.

The core network 100 includes a serving GPRS support node (SGSN) 102 connected to the UTRAN 102 over an Iu PS-interface. The SGSN 102 represents the center point of the packet-switched domain of the core network 100. The main task of the SGSN 102 is to transmit packets to the user equipment 140 and to receive packets from the user equipment 140 by using the UTRAN 120. The SGSN 102 may contain subscriber and location information related to the user equipment 140.

The UTRAN 120 includes radio network sub-systems (RNS) 122A and 122B, each of which includes at least one radio network controller (RNC) 124A, 124B and node Bs 126A, 126B, 126C, 126D.

Some functions of the radio network controller 124A, 124B may be implemented with a digital signal processor, memory, and computer programs for executing computer processes. The basic structure and the functionality of the radio network controller 124A, 124B are known to one skilled in the art, and only details relevant to the present solution are discussed in detail.

The node Bs 126A, 126B, 126C, 126D implement the Uu-interface, through which the user equipment 140 may access the network infrastructure.

Some functions of the base stations 126A, 126B, 126C, 126D may be implemented with a digital signal processor, memory, and computer programs for executing computer processes. The basic structure and operation of the base station 126A, 126B, 126C, 126D are known to one skilled in the art, and only the details relevant to the present solution are discussed in detail.

The user equipment 140 may include two parts: mobile equipment (ME) 142 and a UMTS subscriber identity module (USIM) 144. The mobile equipment 142 typically includes radio frequency parts (RF) 146 for providing the Uu-interface. The user equipment 140 further includes a digital signal processor 148, memory 150, and computer programs for executing computer processes. The user equipment 140 may further comprise an antenna, a user interface, and a battery not shown in FIG. 1. The USIM 144 comprises user-related information and information related to information security in particular, for instance an encryption algorithm.

Figure 2:
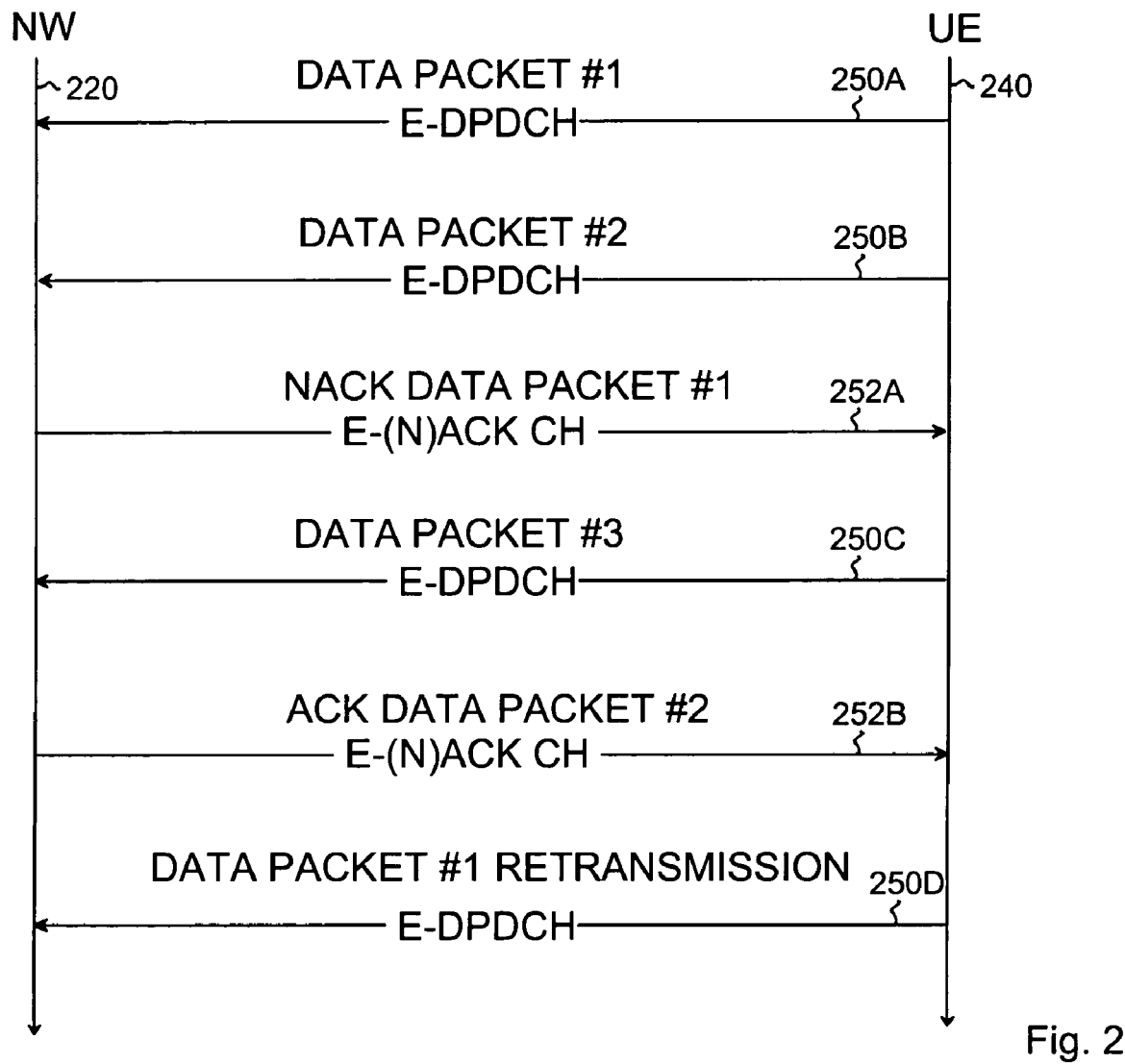
FIG. 2 illustrates a flow chart of a retransmission protocol.

FIG. 2 illustrates an example of uplink data packet transmission between a network (NW) 220 and user equipment (UE) 240. An uplink control channel, such as an uplink DPCCH (Dedicated Physical Control Channel) defined in the 3GPP ($3^{rd}$ Generation Partnership Project) specification, transmitted by the user equipment 240, includes pilot sequences. The network 220 encodes the pilot sequences and estimates signal quality parameters, such as SIR (Signal-to-Interference Ratio), of the uplink DPCCH.

The user equipment 240 may be connected to the network infrastructure 220 over an uplink physical data channel, such as a DPDCH (Dedicated Physical Data channel) defined in the 3GPP specification. The uplink physical data channel represents a conventional data channel, which as such excludes the use of the HSUPA protocol. High data rate packet services on the uplink can be provided by a physical HSUPA channel, such as an E-DPDCH (Enhanced Dedicated Physical Data Channel) defined in the 3GPP specification. The E-DPDCH transfers data packets at predetermined intervals, such as a TTI (Transmission Time Interval). Each data packet is received, and a CRC (Cyclic Redundancy Check) procedure, for example, can be used in the receiver, which in the embodiment of FIG. 2 is a network element, to test whether or not the packet was received successfully.

An acknowledgement message is generated for each data packet on the basis of the test. If the data block was received successfully, the block acknowledgement message indicates "acknowledgement (ACK)". If the data block was received unsuccessfully, the block acknowledgement message indicates "non-acknowledgement (NACK)". The block acknowledgement message is transmitted from a base station belonging to the infrastructure 220 over an HSUPA acknowledgement message channel referred to as E-(N)ACK channel.

FIG. 2 shows one example of data packet transmission, wherein data packets #1, #2 and #3 are transmitted from a UE to a NW in respective signals 250A, 250B and 250C. Data packet #1 is received unsuccessfully in the NW and therefore a NACK 252A is generated. The unsuccessfully received data packet #1 is retransmitted in signal 250D.

Figure 3:
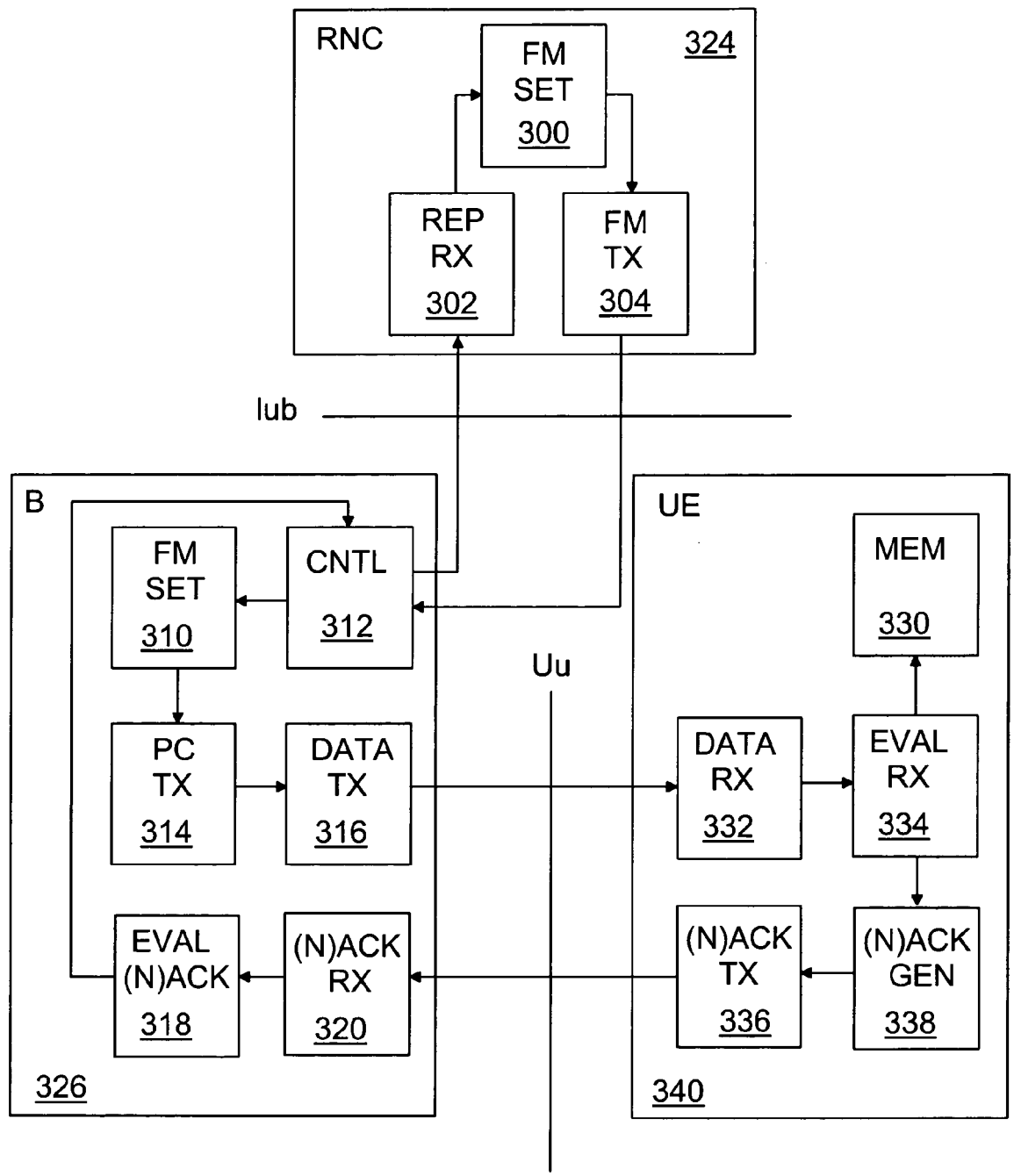
FIG. 3 shows one embodiment of an arrangement according to the invention.

FIG. 3 illustrates one embodiment of the arrangement according to the invention. In the embodiment of FIG. 3, wherein downlink transmission is disclosed, Node B 326 is a transmitting end and user equipment 340 is a receiving end. FIG. 3 only shows functionality that is relevant to the invention.

The illustrated radio network includes a radio network controller 324 controlling Node B 326. The radio network controller 324 operates with Node B 326 over an Iub-interface and Node B operates towards the user equipment 340 over an Uu-interface.

Node B 326 includes means for transmitting 316 downlink transmission to the user equipment 340. The downlink transmission can be HSDPA transmission, for instance. Transmitted data packets are received in receiving means 332 of the user equipment 340. Transmitting means 316 of the transmitter and the receive means 332 of the receiver may include conventional means for implementing a radio connection, such as transmit/receive antennas, filters, amplifiers, hardware/software for implementing data processing, for instance.

Received data packets are evaluated in evaluating means 334 of the user equipment. The evaluating means can assess the acceptability of a data packet by evaluating some generally known packet data quality measure, such as a cyclic redundancy check (CRC), which is part of a data decoding process.

Upon the acceptability evaluation, acknowledgement generating means 338 generate an ACK/NACK regarding the data packet. The formed acknowledgement message is subsequently sent by acknowledgement sending means 336.

Data packets which are not received successfully can be stored in a memory 330 of the user equipment. If a non-accepted data packet is a first instance of the data packet in question, it is checked whether the storing means has a storage position available. If a storage position is available, the first instance of the data packet is stored in the available storage position. If the non-accepted data packet is a first instance of the data packet and there is no storage position available, the data packet cannot be stored and the soft-combining gain for that process is lost. If the non-accepted data packet is a second or subsequent instance of a particular data packet and the data packet has already a reserved storage position in the memory, the second or subsequent instance of the data packet is soft-combined with the data in the memory.

Node B 326 includes means for receiving 320 an acknowledgement message. The acknowledgement message is evaluated in evaluating means 318 either to conclude that a transmitted data packet was successfully received in the user equipment (ACK is received in the base station), was unsuccessfully received (NACK), or if the acknowledgement message can not be successfully received, transmission is interpreted to be discontinuous transmission (DTX).

Node B 326 of FIG. 3 also includes a controller 312, which provides the Iub-interface towards the radio network controller 324. Via this interface, the Node B 326 can report to the RNC about the success of the data packet transmission towards the user equipment 340. The report may include information about whether the reception of a data packet was ACK, NACK or DTX in the user equipment. The radio network controller contains means for receiving 302 a submitted data transmission report. The report is utilized in fade margin adjustment means 300 of the RNC. The fade margin adjustment means are configured to adjust the fade margin parameter which depicts the excess power over the principal power level determined for the transmitter. The default value or the initial value of the fade margin may be selected by the network. Alternatively, the transmitter may select the default value of the fade margin autonomously.

In one embodiment, the network controls the size of the power up/down step of the fade margin. The step size need not be fixed but can be variable depending on the propagation environment, for instance. Thus, in an environment subject to strong fading, the power up step might be greater than the corresponding step in an only slightly fading environment.

It is clear that setting of the transmitter fade margin value can be based on more than one received acknowledgment messages. There may a threshold value for a number of successive negative acknowledgments, for instance, which causes the network to order a power up by increasing the fade margin value.

A value set for the fade margin is transmitted to Node B by means for transmitting 304 the fade margin.

In Node B, means for setting the fade margin value receive the setting given by RNC and may store the setting in a memory, for instance. Transmit power control means 314 may add the fade margin value to a power level setting, which may be based on a target signal-to-interference ratio of the received signal in the receiver.

The equipment and apparatus units shown in FIG. 3 can be implemented by software, for instance. Alternatively, the functionality can be implemented by ASIC (Application Specific Integrated Circuit) or FPGA (Field Programmable Gate Array). The arrangement of FIG. 3 is configured to downlink data transmission. The arrangement can correspondingly be adapted to uplink transmission. In such a case, the radio network controller 324 may control the fade margin setting of the user equipment.

Figure 4:
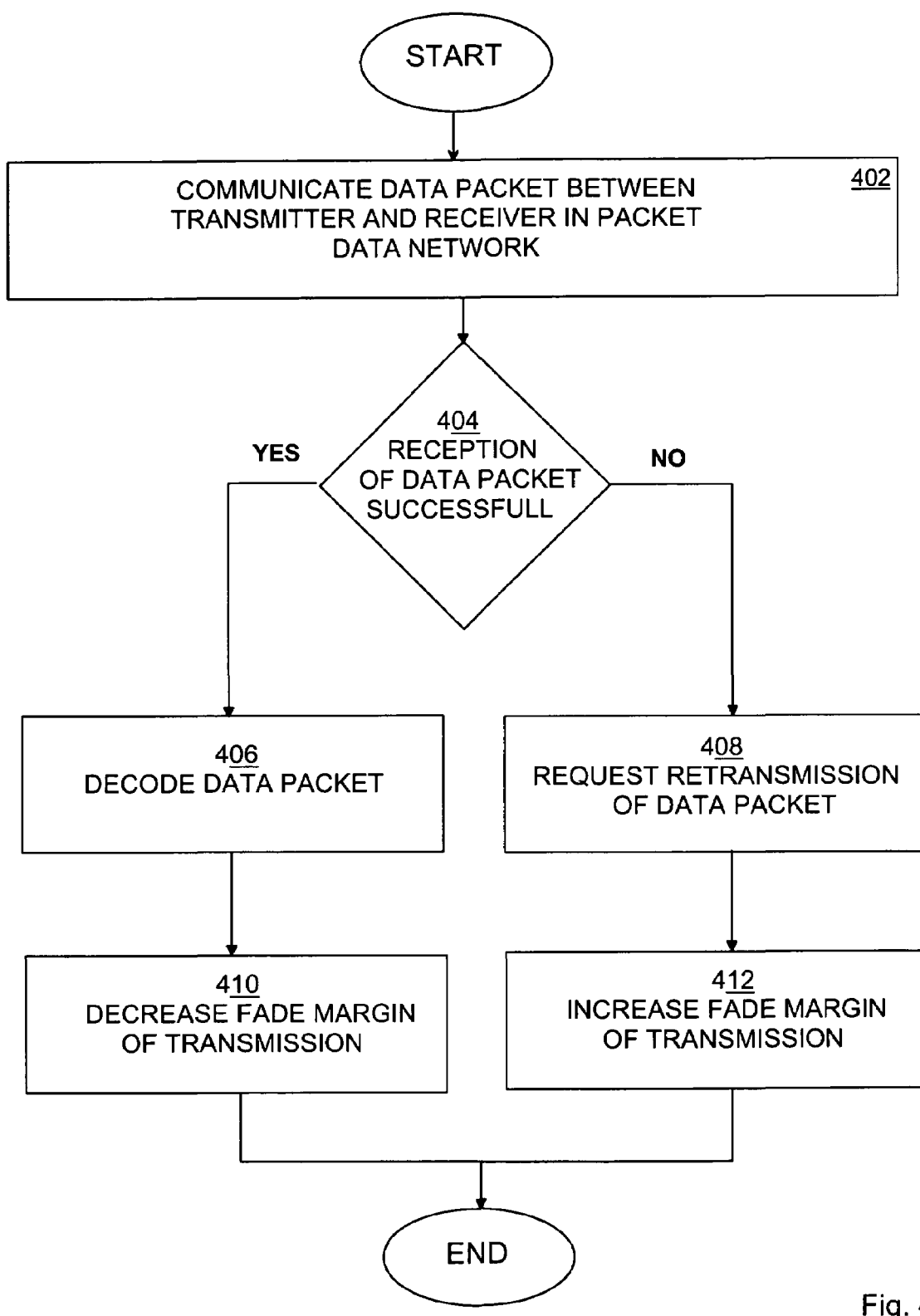
FIG. 4 shows one embodiment of a method according to the invention.

FIG. 4 illustrates one embodiment of the method according to the invention. In phase 402 of FIG. 4, data packets are communicated between a transmitter and a receiver in a data packet network. The transmission may occur either on the uplink or the downlink. In uplink transmission, mobile equipment acts as a transmitter and a base station acts as a receiver. On the downlink, the base station is the transmitter.

In step 404, the receiver evaluates whether a received data packet fulfils a predetermined quality criterion. If the data packet is received successfully and the data therein can be decoded, the receiver of the data packet may send a positive acknowledgement message ACK to the transmitter. The method proceeds to step 406 for decoding the packet. In 410, the fade margin of the transmit signal is decreased. In practice, this means that the power of the transmit signal is decreased. Thus, the power of new data packets and/or retransmission data packets may be decreased.

If the data packet cannot be decoded successfully in step 404, the receiver of the data packet may send a negative acknowledgement message NACK to the transmitter and thereby request retransmission of the data packet as shown in step 408. In 412, the fade margin of the transmit signal is increased.

In one embodiment, the network may control the fade margin both in the network element, such as a base station, and in the mobile equipment. The fade margin may be connection-specific.

The method and the apparatus can be applied in conjunction with open-loop power control. As an example of open-loop power control, uplink transmission may be considered; wherein a bi-directional connection is provided between the user equipment and the network infrastructure, and the principal data traffic is transmitted from the user equipment to the network. At first, the network indicates, by signaling, the power level it uses in downlink transmission. Then, the user equipment measures the signal power in the downlink transmission. On a fading downlink channel, measurement of the downlink transmit power can be averaged over a certain period. In the user equipment, based on the transmit power used by the base station, and the measured power level in the user equipment, the user equipment can determine the path loss between the network and the user equipment. Based on the path loss, the user equipment can determine a suitable power level for uplink transmission. The user equipment can increase the determined transmit power by a fade margin value, which can also be signaled to the user equipment from the network. The embodiments may be implemented as a computer program comprising instructions for executing a computer process for controlling transmit power in a radio network.

The computer program may be stored on a computer program distribution medium readable by a computer or a processor. The computer program medium may be, for example but not limited thereto, an electric, magnetic, optical, infrared or a semiconductor system, device or transmission medium. The medium may be a computer readable medium, a program storage medium, a record medium, a computer readable memory, a random access memory, an erasable programmable read-only memory, a computer readable software distribution package, a computer readable signal, a computer readable telecommunications signal, and a computer readable compressed software package.

It will be obvious to a person skilled in the art that as technology advances, the inventive concept can be implemented in various ways. The invention and its embodiments are not limited to the examples described above but may vary within the scope of the claims.

What is claimed:

1. An apparatus, comprising:
   a transmitter configured to transmit a signal including data packets to another receiver;
   a receiver configured to receive acknowledgement messages from the other receiver, each acknowledgement message indicating whether or not a data packet is received successfully; and
   an adjustor configured to adjust transmit power based on an adjustment of a fade margin parameter of the signal in the transmitter,
   wherein the fade margin parameter is adjusted based on whether the received acknowledgement message is a positive or negative acknowledgement, and
   wherein the fade margin parameter corresponds to an excess power over a target power of the transmit signal.

2. The apparatus according to claim 1, wherein
   the adjustor is further configured to adjust the transmit power in at least one power adjustment step.

3. The apparatus according to claim 2, wherein
   the adjustor is further configured to set a default value for a power adjustment step.

4. The apparatus according to claim 2, wherein
   a step size of the at least one power adjustment step is variable.

5. The apparatus according to claim 1, wherein
   the receiver is further configured to receive the positive acknowledgement from the other receiver if the quality of the data packet fulfils a predetermined quality criterion.

6. The apparatus according to claim 5, wherein
   the adjustor is further configured to decrease the transmit power of the signal if the positive acknowledgement message is received.

7. The apparatus according to claim 1, wherein
   the receiver is further configured to receive the negative acknowledgement message if the quality of the data packet does not fulfill a predetermined quality criterion.

8. The apparatus according to claim 7, wherein
   the adjustor is further configured to increase the transmit power if the negative acknowledgement message is received.

9. The apparatus according to claim 1, wherein
   the receiver is further configured to interpret an acknowledgement message as a discontinuous transmission if the acknowledgment message cannot be decoded successfully, and
   the adjustor is further configured to increase the transmit power in a case of discontinuous transmission.

10. The apparatus according to claim 1, wherein
    the apparatus is a base station.

11. The apparatus according to claim 1, wherein
    the apparatus is a mobile station.

12. The apparatus according to claim 1, wherein:
    the apparatus is further configured to control the transmit power based on an open-loop power control principle.

13. The apparatus according to claim 1, comprising:
    a reception unit configured to receive a power level parameter to be used by the other receiver when transmitting the signal to the transmitter;
    a measuring unit configured to measure a power level of the signal received by the transmitter from the other receiver;
    a determining unit configured to determine the power level of the signal transmitted from the transmitter based on the power level parameter and the measured power level.

14. The apparatus according to claim 13, comprising:
    another receiving unit configured to receive a fade-margin parameter, the fade-margin parameter indicating an increase in power of the transmit signal power level determined by the determining unit; and
    the adjustor is further configured to add the increase in the power of the fade margin parameter to the power level determined by the determining unit.

15. A computer program embodied on a computer readable medium, the computer program being configured to control a processor to perform:
    transmitting data packets from a transmitter to a receiver;
    receiving an acknowledgement message from the receiver, the acknowledgement message indicating whether or not a data packet is received successfully; and
    adjusting the transmit power based on an adjustment of a fade margin parameter in the transmitter,
    wherein the fade margin parameter is adjusted based on whether the received acknowledgement message is a positive or negative acknowledgement, and
    wherein the fade margin parameter corresponds to an excess power over a target power of the data packets.

16. A computer readable storage medium encoded with instructions that when executed by a computer, performs:
    transmitting data packets from a transmitter to a receiver;
    receiving an acknowledgement message from the receiver, the acknowledgement message indicating whether or not a data packet is received successfully; and
    adjusting the transmit power based on an adjustment of a fade margin parameter in the transmitter,
    wherein the fade margin parameter is adjusted based on whether the received acknowledgement message is a positive or negative acknowledgement, and
    wherein the fade margin parameter corresponds to an excess power over a target power of the data packets.

17. A method, comprising:
    receiving data packets from a transmitter;
    sending an acknowledgement message to the transmitter, the acknowledgement message being a positive or negative acknowledgement and indicating whether or not the data packet was received successfully; and
    receiving an adjusted power of the data packets based on an adjustment to a fade margin parameter,
    wherein the adjusted fade margin parameter is based on whether the acknowledgement message is a positive or negative acknowledgement, and
    wherein the fade margin parameter corresponds to an excess power over a target power of the data packets.

18. A method according to claim 17, further comprising:
    transmitting the positive acknowledgement message to the transmitter if the quality of the data packet fulfils a predetermined quality criterion.

19. A method according to claim 17, further comprising:
transmitting the negative acknowledgement message to the transmitter if the quality of the data packet does not fulfill a predetermined quality criterion.

20. A method, comprising:
transmitting data packets to a receiver;
receiving an acknowledgement message from the receiver, the acknowledgement message indicating whether or not the data packet was received successfully; and
adjusting the transmit power based on an adjustment of a fade margin parameter in the transmitter,
wherein the fade margin parameter is adjusted based on whether the received acknowledgement message is a positive or negative acknowledgement, and
wherein the fade margin parameter corresponds to an excess power over a target power of the data packets.

21. A method according to claim 20, further comprising:
receiving the positive acknowledgement message from the receiver if the quality of the data packet fulfils a predetermined quality criterion.

22. A method according to claim 21, further comprising:
decreasing the transmit power in the transmitter when the positive acknowledgement message is transmitted to the transmitter.

23. A method according to claim 20, further comprising:
receiving the negative acknowledgement message from the receiver if the quality of the data packet does not fulfill a predetermined quality criterion.

24. A method according to claim 23, further comprising:
increasing the transmit power in the transmitter in the case of a negative acknowledgement message.

25. A method according to claim 20, further comprising:
increasing the transmit power if no acknowledgement is received or the acknowledgement cannot be decoded in the transmitter.

26. A method according to claim 20, further comprising:
updating a fade-margin parameter for each transmitter-receiver connection, the fade-margin parameter indicating an increase in power of a target signal power of the transmitter.

* * * * *